(12) United States Patent
Posch

(10) Patent No.: US 9,786,109 B2
(45) Date of Patent: Oct. 10, 2017

(54) USE OF A BIPHASE CODE MATCHED FILTER TO RECEIVE PROTOCOLS WITH CODE VIOLATIONS

(71) Applicant: NXP B.V., Eindhoven (NL)

(72) Inventor: Martin Posch, Graz (AT)

(73) Assignee: NXP B.V., Eindhoven (NL)

( * ) Notice: Subject to any disclaimer, the term of this patent is extended or adjusted under 35 U.S.C. 154(b) by 21 days.

(21) Appl. No.: 14/973,322

(22) Filed: Dec. 17, 2015

(65) Prior Publication Data

US 2017/0178435 A1 Jun. 22, 2017

(51) Int. Cl.
| | |
|---|---|
| H03M 5/00 | (2006.01) |
| H04B 1/00 | (2006.01) |
| H04N 7/12 | (2006.01) |
| G06F 19/00 | (2011.01) |
| H04Q 1/00 | (2006.01) |
| H04L 1/00 | (2006.01) |
| G07C 9/00 | (2006.01) |
| H04L 25/49 | (2006.01) |

(52) U.S. Cl.
CPC ............... *G07C 9/00309* (2013.01); *G07C 2009/00365* (2013.01); *G07C 2009/00373* (2013.01); *G07C 2009/00793* (2013.01); *G07C 2209/61* (2013.01); *H04L 25/49* (2013.01)

(58) Field of Classification Search
CPC ... H03M 5/00; H04B 1/00; H04N 7/12; G06F 19/00
USPC ....... 340/5.61; 348/466; 341/58, 59; 701/33; 375/355
See application file for complete search history.

(56) References Cited

U.S. PATENT DOCUMENTS

| | | | | | |
|---|---|---|---|---|---|
| 5,162,791 | A | * | 11/1992 | Heegard | H03M 5/12 370/445 |
| 5,459,765 | A | * | 10/1995 | Meyer | H03L 7/089 327/12 |
| 5,805,632 | A | * | 9/1998 | Leger | H04L 25/4904 341/55 |
| 5,854,660 | A | * | 12/1998 | Tichelaar | H04N 7/007 348/466 |
| 6,294,992 | B1 | * | 9/2001 | Addy | G08B 25/10 340/514 |
| 6,437,710 | B1 | * | 8/2002 | Tam | H04L 25/493 341/58 |
| 6,810,024 | B1 | * | 10/2004 | Lee | H04L 1/0002 370/282 |
| 8,026,793 | B2 | * | 9/2011 | Luo | B60R 25/24 340/426.36 |
| 8,982,668 | B2 | * | 3/2015 | Horsky | G01S 7/536 367/100 |
| 2005/0007243 | A1 | * | 1/2005 | Emmerling | B60R 25/24 340/426.1 |

(Continued)

OTHER PUBLICATIONS

Tang, S. "Wakeup Receiver for Radio-On-Demand Wireless LANs", IEEE Global Telecommunications Conf., pp. 1-6 (2011).

*Primary Examiner* — Nam V Nguyen
(74) *Attorney, Agent, or Firm* — Rajeev Madnawat

(57) ABSTRACT

In accordance with various example embodiments, a method of receiving a protocol in the receiver, wherein the legacy protocol includes non-biphase encoded information, decoding the legacy protocol using a biphase decoder to produce a detected code, and correlating the detected code with a known code to verify the non-biphase encoded information.

16 Claims, 11 Drawing Sheets

(56) References Cited

U.S. PATENT DOCUMENTS

2011/0098877 A1\* 4/2011 Stahlin ................. G08G 1/161
    701/31.4
2015/0294517 A1 10/2015 Herrala \* cited by examiner

USE OF A BIPHASE CODE MATCHED FILTER TO RECEIVE PROTOCOLS WITH CODE VIOLATIONS

TECHNICAL FIELD

Various embodiments disclosed herein relate to the use of Manchester matched filters to receive protocols with code violations and to enhance the false acceptance rate of a correlator.

BACKGROUND

Passive keyless entry (PKE) and passive keyless go (PKG) systems have gained popularity in recent years. In operation, when a car user has a key apparatus that is equipped with a PKE chip and the user approaches a car and opens the door, a low frequency (LF) communication sequence is sent from the car to the key, and an ultra-high frequency (UHF) communication is sent from the key to the car via a different physical link, and the door is unlocked. Cryptology is involved in both communications to make sure the correct key and car are identified. The same interaction works with the start button using PKG. When one presses the start button, an LF communication of 125 kHz is sent to the key and the system interaction commences so that a user may start the car.

Existing communications sequences may include a code violation ("CV") to be detected by a PKE chip to help determine synchronizations of data. A Manchester matched filter is usually not used to receive code violations. If code violations are received, two architectures are generally used to decode the CV. A system may decode the CV symbols rather than the bits. This result suffers from lower signal to noise performance. Alternatively, separate and additional matched filter(s) can be added in parallel for a wake up ("WU") pattern and the CV to both be processed at the same time. This imposes additional overhead for an additional parallel path, which means additional current consumption.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

According to one embodiment, there is provided a method of decreasing false detection of wake-up patterns of a receiver, including receiving a protocol in the receiver, wherein the protocol includes non-biphase encoded information having a plurality of bit lengths, decoding the protocol using a biphase decoder to produce a detected code, and correlating the detected code with a known code to verify the non-biphase encoded information.

The method may include decoding the protocol to include decoding a code violation and wake up pattern respectively.

The method may include decoding the code violation to result in an irregular pattern of ones and zeroes.

The method may include decoding the protocol to include using a Manchester matched filter to decode the protocol.

The method may include over-sampling the detected code to produce a plurality of bits and inputting the plurality of bits into a correlator.

The method may include decoding the wake up pattern to result in a regular pattern of ones and zeroes and adding the decoded code violation to the decoded wake up pattern to produce a sum pattern.

The method may include correlating the sum pattern to a known pattern to decrease the false wake up rate of the receiver.

The biphase decoder may integrate the protocol over complete bit lengths to produce the detected code.

Another embodiment may include a receiver to decrease false wake-up patterns of a receiver circuit, including a receiver front end configured to receive a protocol, wherein the protocol includes non-biphase encoded information having a plurality of bit lengths, a biphase decoder configured to decode the protocol to produce a detected code, and a correlator configured to correlate the detected code with a known code to verify the non-biphase encoded information.

The protocol may include a code violation and wake up pattern respectively.

The code violation may be decoded to result in an irregular pattern of ones and zeroes.

The biphase decoder may include a Manchester matched filter to decode the protocol.

The detected code may be over-sampled to produce a plurality of bits and the plurality of bits is input into a correlator.

The wake up pattern may be decoded to result in a regular pattern of ones and zeroes and the decoded code violation is added to the decoded wake up pattern to produce a sum pattern.

The sum pattern may be over-sampled to produce a plurality of bits and the plurality of bits is input into a correlator.

The sum pattern may be correlated to a known pattern to decrease the false wake up rate of the receiver.

The biphase decoder may integrate the protocol over complete bit lengths to produce the detected code.

BRIEF DESCRIPTION OF THE DRAWINGS

Embodiments of the invention are described in more detail and by way of non-limiting examples with reference to the accompanying drawings, wherein.

DETAILED DESCRIPTION

Figure 1:
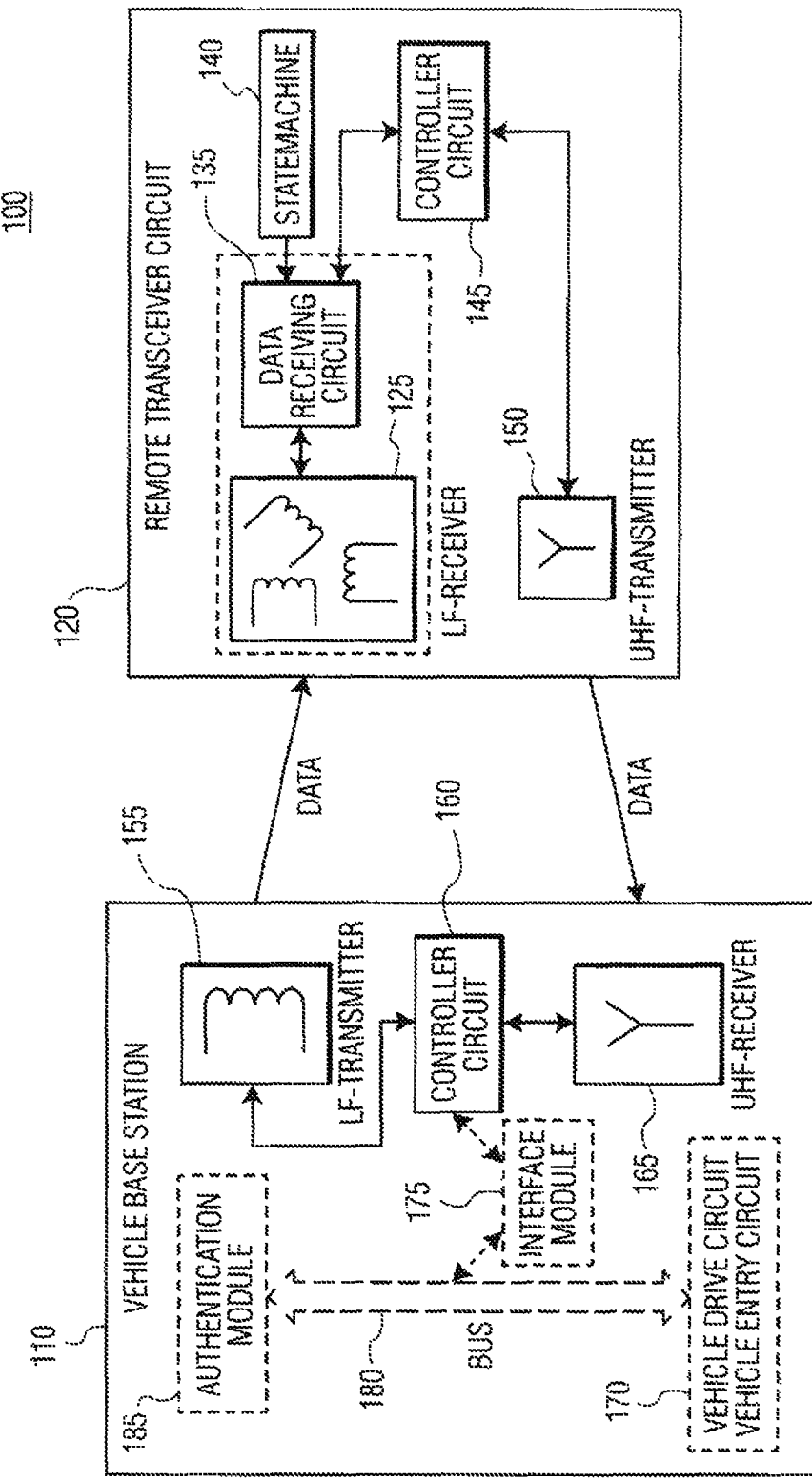
FIG. 1 illustrates apparatuses and a system to communicate with a remote transceiver circuit in accordance with an example embodiment.

The system described herein is related but not limited to the wireless communication link between a car and the car keys. The system applies in general to all wired or wireless communication protocols that use biphase codes. Though the following description is given for Manchester encoded signals, which is one particular form of a biphase code, embodiments described herein can be applied for all types of biphase codes. Embodiments described herein include a Manchester matched filter to receive protocols with code violations, and enhance the false acceptance rate of a correlator used therewith.

Biphase coding adds a level of complexity to the coding process but in return includes a way to transfer a frame data clock that can be used in decoding to increase accuracy. In biphase coding there may be a state transition in the message signal of every bit frame. This allows a demodulation system to recover the data rate and also synchronize to bit edge periods. With this clock information, the data stream can be recreated.

Manchester coding, which is a type of biphase coding, provides a means of adding the data rate clock to the message to be used on the receiving end. Manchester coding provides the added benefit of yielding an average DC level of 50%. This has positive implications in the demodulator's circuit design as well as managing transmitted RF spectrum after modulation. This means that in modulation types where the power output is a function of the message such as amplitude modulation (AM), the average power is constant and independent of the data stream being encoded. Manchester coding states that there will be a transition of the message signal at the mid-point of the data bit frame. What occurs at the bit edges depends on the state of the previous bit frame and does not have to produce a transition. A logical "1" is defined as a mid-point transition from low to high and a "0" is a mid-point transition from high to low.

A receiver architecture is described herein to receive Manchester encoded data. To make new receiver architecture more versatile, backward compatibility has been designed to allow the architecture to receive Manchester data plus code violations.

By way of example, the system described herein is related to a wireless communication link between a car and the car keys thereof. A car (base station) transmits protocol frames in the LF band (125 kHz) and a receiver in the car keys receives and decodes the frames. The LF transmission is unidirectional from the car to the keys and it may be complemented with an UHF transmission from the keys to the car. The LF band is an Industrial Scientific Medical (ISM) band which can be useful in a metal environment (as with automobiles) and is relatively insensitive to de-tuning (e.g., by touching). The LF receiver in the car key may stay active all the time, or in a polling mode. Thus current consumption is a concern.

Issues may arise when new technologies use systems that have been in place for years. For instance, a car manufacturer that has been using a keyless entry system for years may desire to upgrade the communication link between key and car, but cannot risk changing design of the system or protocols used between key and car, and prevent newer systems from working with older ones. Thus, new communication protocols may be backward-compatible to be able to receive legacy protocols and process information not initially intended to be used with a newer system.

There are various approaches to addressing legacy protocols with code violations in an incoming sequence such as an FSync pattern, including decoding the code violation fully, accepting the code violation and making use of it as good as possible, or ignore the code violation. Rather than ignoring the code violation or attempting to fully decode it, embodiments described herein have found a way to accept and decode the violation and use the decoded information for purposes not originally intended.

A design goal of embodiments described herein regarding a PKE system is to make the system more robust in terms of general interference. To achieve this, and also increase device sensitivity, a matched filter may be used in the receive path. Matched filters can be used for superior signal to noise (S/N) performance. Upgrades to the PKE system can use a Manchester encoded signal, and thus a Manchester matched filter (MMF) is discussed herein.

A receiver is described herein that receives and decodes Manchester encoded data. Embodiments described herein provide a mechanism to receive and decode code violations directly with a Manchester matched filter instead of using additional hardware to detect the code violation.

A PKE/PKG receiver described herein may make use of several integrated circuit devices that include a fully integrated single-chip solution combining remote keyless entry (RKE), PKE and immobilizer (IMMO) functionality designed for use in automotive environments.

The device provides a motion detection function that may detect state changes on amotionsensor pin and may wake-up the CPU core. The device can be configured to automatically disable an LF Active receiver block to save power when key-fob still (nomotion) is detected, and also, to automatically enable the LF Active receiver when key-fob in motion is detected.

The device provides means for capacitive tuning to maintain an optimal resonance frequency and optimize reception of an incoming LF signal in order to save cost in the bill of material.

One feature of an integrated chip device described herein is device wake up. Various wake up events terminate a POWER OFF state of the device, including presence of an LF field, port wake-up (button press), motion sensor wake-up, detection of valid LF active wake-up pattern, interval counter or real time clock wake-up, or battery insertion.

A PKE chip associated with embodiments described herein includes a passive interface, or immobilizer. The contactless passive LF interface provides means to utilize the chip device as a contactless transponder, capable to derive its power supply and system clock by inductive coupling to an LF field generated by a corresponding base station. The LF field is used to receive data from and transmit data to the base station under control of a RISC controller within the integrated circuit chip. Independent of the device operating mode, the contactless interface is capable to detect the presence of an LF field at any channel and to provide a corresponding signal to wake-up the device from POWER OFF state or to interrupt device operation.

The PKE receiver may be known as an active interface within a chip device. The device supports communication for passive keyless entry (PKE) applications by a highly sensitive 3D LF active interface that receives data over a wide input range. The 3D LF active interface includes a 3D LF receiver and a preprocessor. The LF interface autonomously monitors the coil inputs for a modulated LF carrier and, in case a pre-defined LF telegram is detected, a device wake-up is caused and the Manchester decoded data will be buffered for post-processing with the RISC. Embodiments described herein discuss the reception of a pre-defined telegram including a CV and a new way to process this telegram.

FIG. 1 illustrates apparatuses and a system 100 to communicate with remote transceiver circuit 120, in accordance with example embodiments of the present disclosure. The system 100 may include a vehicle base station 110 and a remote transceiver circuit 120. Each of the base station 110, and remote transceiver circuit 120 can be implemented separately, in separate embodiments. The system 100 can be implemented with the base station 110 and the remote transceiver circuit 120 while the base station 110 is also interacting with another remote transceiver circuit. In these contexts, the remote transceiver circuit 120 may be a PKE and/or PKG type of hand-held device that can be carried by an operator (e.g., in a pocket or handbag).

The vehicle base station 110 includes a transmitter 155, receiver 165, and a controller circuit 160. The vehicle base station transmitter 155 in one embodiment is a low-frequency transmitter, and the receiver 165 may be an ultra-high-frequency receiver.

The vehicle base station 110 may utilize a controller circuit 160 to control the transmitter 155 and receiver 165 to communicate signals with remote transceiver circuit 120. Accordingly, the controller circuit 160 may be implemented in accordance with one or more embodiments herein, to facilitate data transmission via the transmitter 155 to communicate with the remote transceiver circuit 120.

In accordance with one embodiment, the controller circuit 160 of the vehicle base station 110 may delegate authentication of the remote transceiver circuit 120, as discussed in more detail above, to an authentication module 185. Accordingly, the controller circuit 160 may generate an output to the interface module 175 containing the response data of the remote transceiver circuit 120 as received by the vehicle base station 110 receiver 165. The interface module 175 then communicates the response data to an authentication module 185 via a bus 180. The authentication module 185 processes the response data received from the remote transceiver circuit 120 with stored authentication data. If the remote transceiver circuit 120 is authenticated, the authentication module 485 communicates activation data over the vehicle bus 180, and the activation data allows for the operation of a vehicle drive circuit 170 that facilitates operation of a vehicle drive system in the vehicle.

The remote transceiver circuit 120 may include a receiver 125, a transmitter 150, a controller circuit 145, a state machine 140, and a data-receiving circuit 135. The remote transceiver circuit 120 utilizes a controller circuit 145 to control the transmitter 150 and receiver 125 for communicating signals with vehicle base station 110. The state machine 140 of the remote transceiver circuit 120 facilitates the on and off modes of the data-receiving circuit 135.

The embodiment shown in FIG. 1 may be implemented using one or more approaches as described herein, to conserve power. In addition, one or more embodiments may be implemented with transceiver circuits used in vehicle applications, such as PKE applications, such as with single-chip keyless entry transceivers employing a RISC controller. The RISC controller may be powered with an ISO 14443 type A interface. In other embodiments, the remote transceiver circuit may implement a controller with a built-in UHF transmitter or a transmitter with a separate controller.

Figure 2:
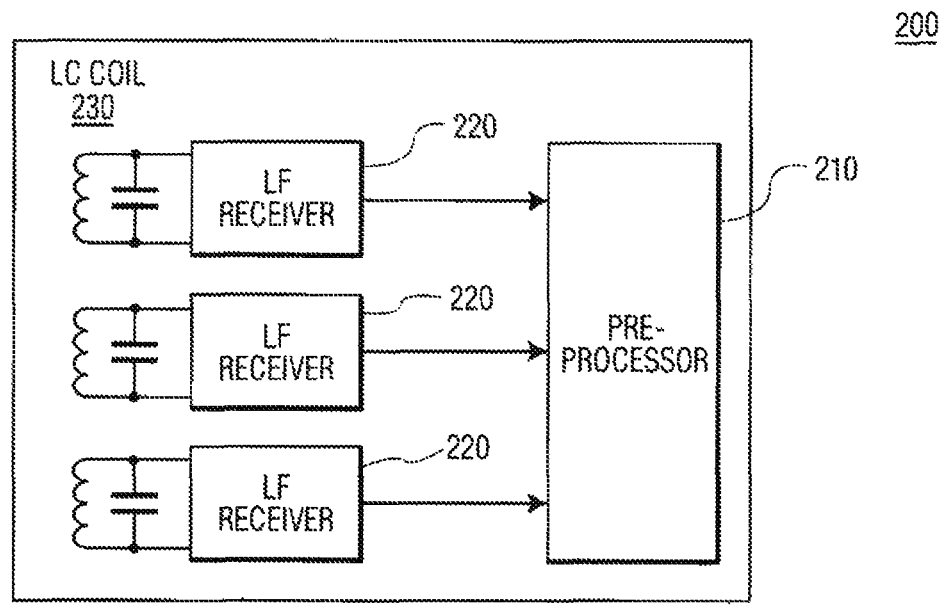
FIG. 2 illustrates a general block diagram of the LF active interface in accordance with an example embodiment.

FIG. 2 illustrates a general block diagram of the LF active interface 200.

The PKE chip device may include a preprocessor 210 working independently of a RISC core to autonomously monitor the demodulated, digitized signal coming from one or a plurality of LF receivers 220 for a distinct LF telegram. Except for the CVs discussed herein, the digitized input data of the preprocessor 210 is Manchester coded and characterized by time durations between the signal's rising edges (ones) and falling edges (zeroes). Legacy protocols are used today. When enabled the LF interface 200 may autonomously monitor coil inputs 230 for a modulated LF carrier representing a distinct LF telegram to cause a device wake-up.

Figure 3:
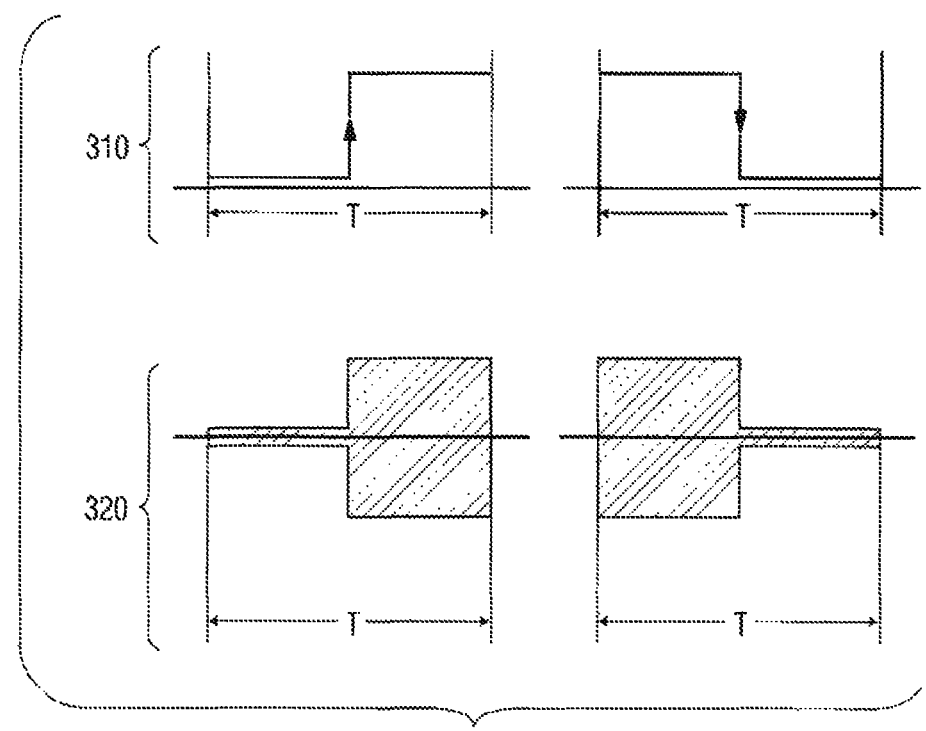
FIG. 3 illustrates Manchester coded bits and the related LF patterns in accordance with an example embodiment.
Figure 5:
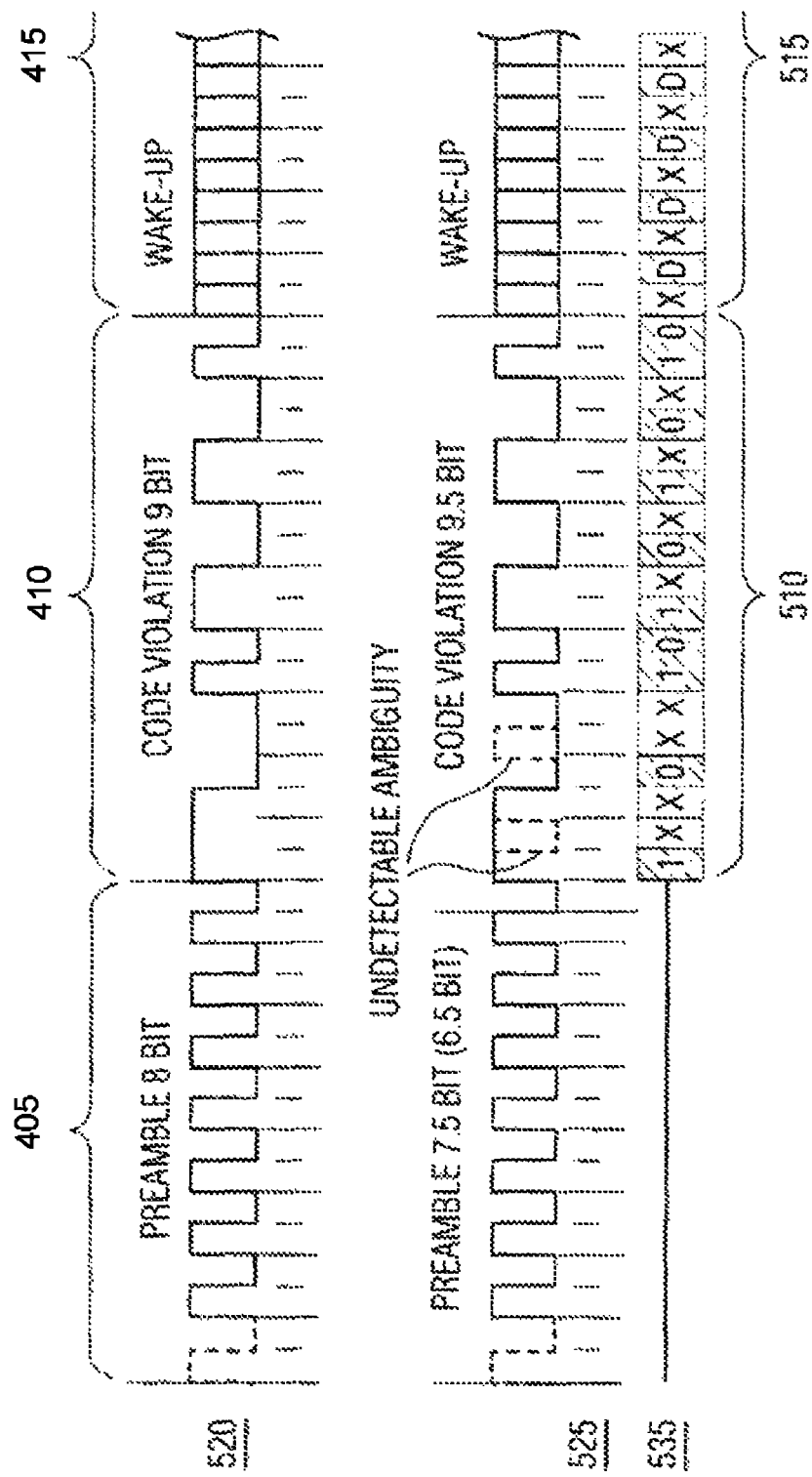
FIG. 5 illustrates an example of an LF legacy telegram in accordance with an example embodiment.

FIG. 3 illustrates Manchester coded bits 310 and the related LF patterns 320. As illustrated, the value of the bit is based upon the direction of the transition of the signal. A Manchester coded bit may be a "1" when transitioning from low to high in the middle of a bit. A Manchester coded bit may be a "0" when transitioning from high to low. These results may also be inverted to read a logic one as high to low, and a logic zero as low to high. A time T, or $T_{BT}$ illustrated in FIG. 5, represents one bit time, the time taken to read a bit.

Figure 4:
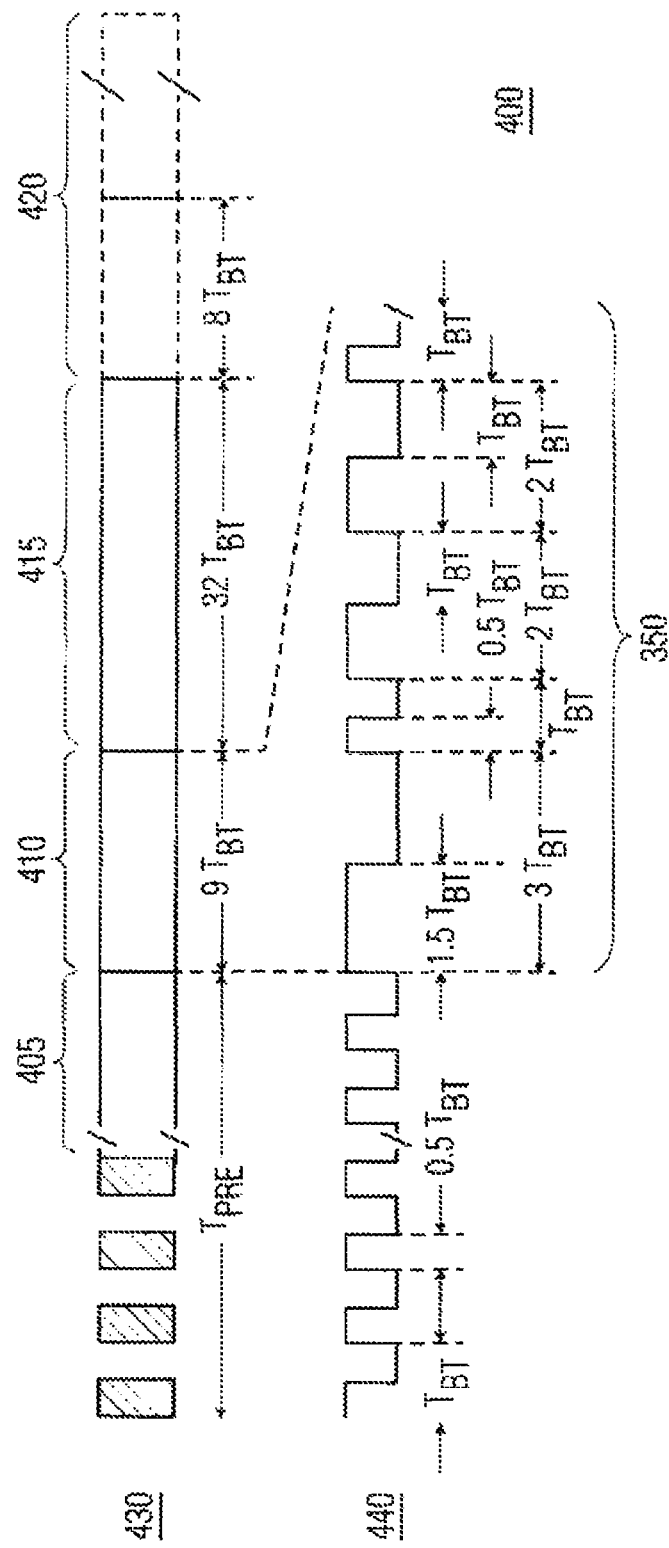
FIG. 4 illustrates an LF telegram organization in accordance with an example embodiment.

FIG. 4 illustrates an LF telegram organization 400. An LF telegram 430 may include a Preamble 405, a Code violation pattern 410 (synchronization), and a Wake-up ID 415. The preamble 405 may be a sequence of Manchester coded "zeros" allowing the LF interface to settle its analog circuitry. A code violation 410 ("CV") is used for frame synchronization in order to synchronize the receiver so that it can later receive the wake up ID 415 and data 420 which has been Manchester encoded. During the wake-up sequence first a CV pattern 410 has to be detected, which is a pre-defined startup pattern transmitted at the beginning of the data telegram. The CV pattern 410 features a fixed length of 8 bit time followed by a Manchester coded zero bit, so 9 bits in total.

A running code violation detection process is indicated by MODE bits in the PKE chip. If any deviate onto the expected code violation 410 is detected, the code violation detection unit is reset and starts again. The synchronization pattern includes the CV pattern 410.

The wake up ID 415, actual data 420, and everything after the code violation 410 has been Manchester encoded. A partial signal representation of a demodulated LF telegram 440 is illustrated, including the code violation portion 450, in which various bit times $T_{BT}$. The bit times between rising and falling edges can be 1.5 bt, 1 bt, or 0.5 bt. These various bit times for the decoded CV 410 can result in an irregular pattern of ones and zeroes. After recognizing the synchronization pattern, the preprocessor decodes the Manchester coded data stream and searches for a user programmed wake-up code.

PKE receivers described herein estimate a transmitted signal by using a technique known as matched filtering. The receiver may employ such a technique with a filter whose shape is "matched" to the transmitted signal's pulse shape.

Using a Manchester matched filter, a receiver can accept the value of a bit at the end of the bit. In this method, all of the energy within a bit can be integrated into two bit patterns. As illustrated in FIG. 2, 0 to T is the length of a bit. To read the bit using a MMF, an integration may be conducted over the length of the bit and at the end of the bit the information can be determined. The minimum resolution is virtually the time of one T, also known as one bit time. Not using MMF, there is no determination made of the values in between a bit. Embodiments described herein define a scheme for every bit, whether a sample is taken in the middle of the bit, the sample is taken at the end of the bit or none is evaluated.

FIG. 5 illustrates an example of an LF legacy telegram according to embodiment described herein.

As discussed herein, a legacy protocol frame 520 having a preamble 405, CV 410, and WU pattern 415 is received by the PKE receiver from a car base station. The preamble 405 illustrated in FIG. 5 is Manchester decoded. The preamble 405 is used to set the receiver for analog or digital communications. The CV 410 is the first bit sequence to be detected.

As a reference the Wake-up ID 415 illustrated in FIG. 5 is Manchester encoded and provides an orderly decoding scheme with edges at every half bit, as indicated by the wake-up detected pattern 515. Taking the output of a Manchester filter, every bit is checked at its end to see if it's a zero or one (labeled with "D" like data bit in FIG. 5).

In contrast, for the CV 410 including an 8 bit CV plus 1 Manchester bit 0, edges are intentionally out-of-sync. The edges of the CV 410 are evaluated at different instances in time in line with a Manchester grid 525, a result being the Manchester decoded output 535 as illustrated at 510 and 515. The value 0 or 1 is only valid at the sample point at half bit or bit edge but not for the complete half bit period. As illustrated, the decoded CV 510 results in an irregular pattern of ones and zeroes, in which some portions of the CV 410 may not be decoded. The irregular decoded CV pattern 510 may include ones or zeroes detected a combination of one half bit apart, two half bits apart, and three half bits apart. The portions three half bits apart may record an error because the Manchester decoder is expecting a rising or falling edge every whole bit or half bit.

Using a MMF the code determinations are marked, because there will be either a rising edge or a falling edge at the end of every half bit. Some code determinations of the CV 410 are aligned at a first bit half, others are aligned at a second bit half. Using the MMF, there is expected to be a bit change every bit or half bit. Any longer duration brings an error to the code. In this system, since CVs may change every bit or half bit, use of a MMF in the single input stream is beneficial.

If the CV pattern 410 is known, the MMF can be used to receive part of the code violation. The system recognizes that if there is a CV 410, in the beginning of the 9 bit shaving a sequence of 1.5 bits high and 1.5 bits low, there are some parts that cannot be decoded, as indicated by the dashed lines. At these points in time there is no means to detect the actual value, and that means those parts of the CV may be ignored. This is one reason why this method cannot be applied in general to all types of CVs used in all applications, but can be used in a restricted and purposeful way as described herein. In this case where the MMF is being used to make a new system backward compatible, the MMF can be used to gain sufficient information from the code violation so that the system still works, and it has added benefit to prevent false wake up as described herein.

Decoding the CV 410, 0.5 preamble bits and 9 CV bits may be used to extract information of 8 bits, thus 10 samples are possible. Part of the CV 410 will be ambiguous, yet all possible combinations will be accepted. As described herein, to verify the CV 410, the system will reuse an existing shift register and double the number of taps to implement two samples per bit instead of one per bit. Knowing that certain code sections will not decode properly is acceptable because the majority of CV sections will be Manchester decoded, providing additional information. The CV 410 is intended to synchronize the receiver to the incoming data stream.

Embodiments described herein that use a MMF along a same path as a correlator change the efficiency and sensitivity of the system. Other implementation proposals process this CV 415 with an additional processing path, but with greater current consumption.

Figure 6:
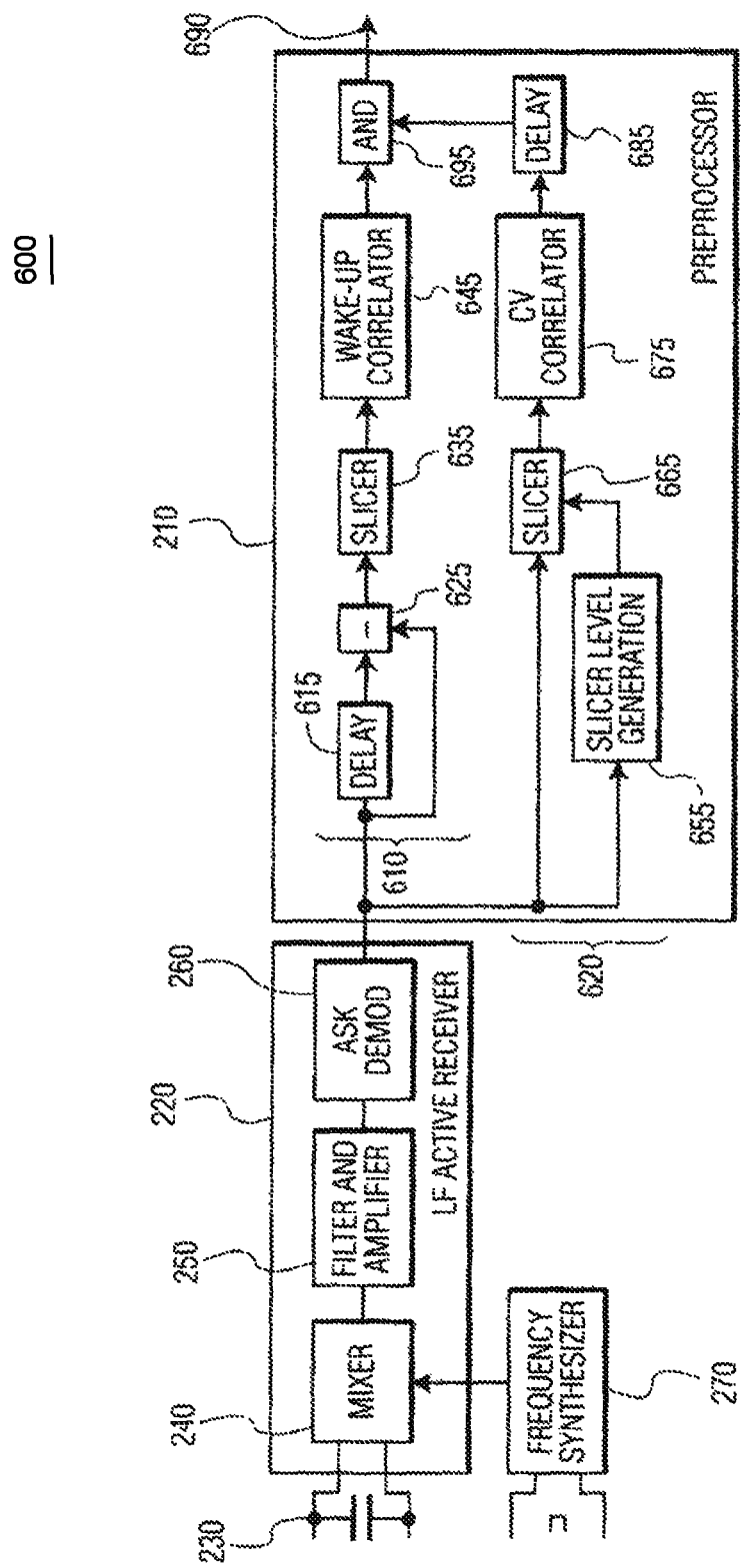
FIG. 6 illustrates an alternate design in which a second processing path could be used to process code violations.

FIG. 6 illustrates an alternative design 600 in which a second processing path 620 could be used, in addition to a first path 610, to match to a particular CV. A first path 610 including a MMF includes a buffer (not illustrated) to receive an intermediate frequency ("IF") signal and split the input signal into two parts. The WU pattern 415 to be detected and confirmed in a first path 610, and a CV 410 to be processed by second path 620. The WU pattern 415 along first path 610 is acted upon by delay component 615 and subtractor 625 before being sliced into bits by slicer 635 and verified by wake-up correlator 645 that may output a detected WU.

The alternative design 600 may thus use a chip matched filter ("CMF") in the second path 620 in parallel with a Manchester matched filter. The CMF decodes the CV 410 and the WU pattern 415 is decoded with the MMF. The input signal is branched before the slicer 665 and slicer level generation 655 and the CMF is used to decode every bit half separately. One drawback to this circuit is a drop in sensitivity, and second, there is a complete parallel part to do CV detection, which adds to circuit complexity and increased current consumption.

The additional path 620 includes slicer level generation block 655 and slicer 665 that break the CV down into individual bits. This signal is then transferred to a CV correlator 675 that detects the CV. A successful CV detection is delayed 685 by the length of the wake-up ID and passed to an AND circuit 695 that combines the detected WUP patterns and the successful CV code detection into a total detected WU pattern 690.

Embodiments described herein eliminate the separate path 620 that would be used to decode a CV 410 that is not Manchester encoded. As an alternative, by increasing the sampling rate of a CV 410 using a Manchester matched filter, additional information such as a CV 410 is able to be detected, verified, and used later in the circuit.

Figure 8:
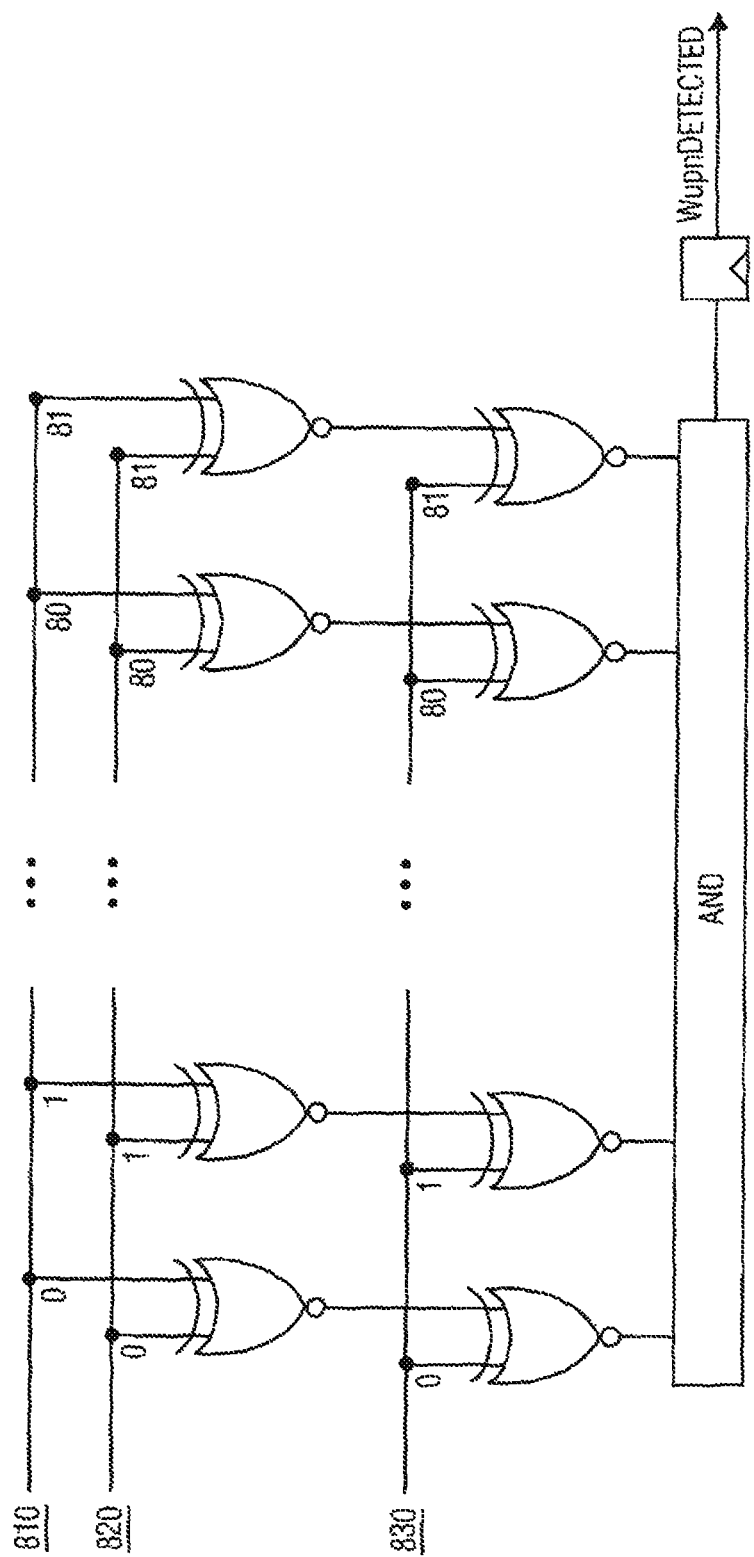
FIG. 8 illustrates an example logic representation of a correlator in accordance with an example embodiment.

In embodiments described herein, such as illustrated in FIG. 8, instead of adding the additional CV detection and circuitry, the MMF used for WU pattern 415 detection can be used to decode the CV, and this additional information may be used to prevent false WU pattern 415 occurrences when input and verified by a correlator.

Embodiments described herein use a Manchester matched filter, which is used for subsequent data reception, to also receive the CV 410. Use of the MMF allows the originally undesired or unused CV 410 to be used in a positive way, by passing the CV 410 through a correlator, to verify the CV 410. This overcomes the increased power consumption associated with the implementation of two parallel paths, one optimized for data and one for CV, which increases current consumption.

Figure 7:
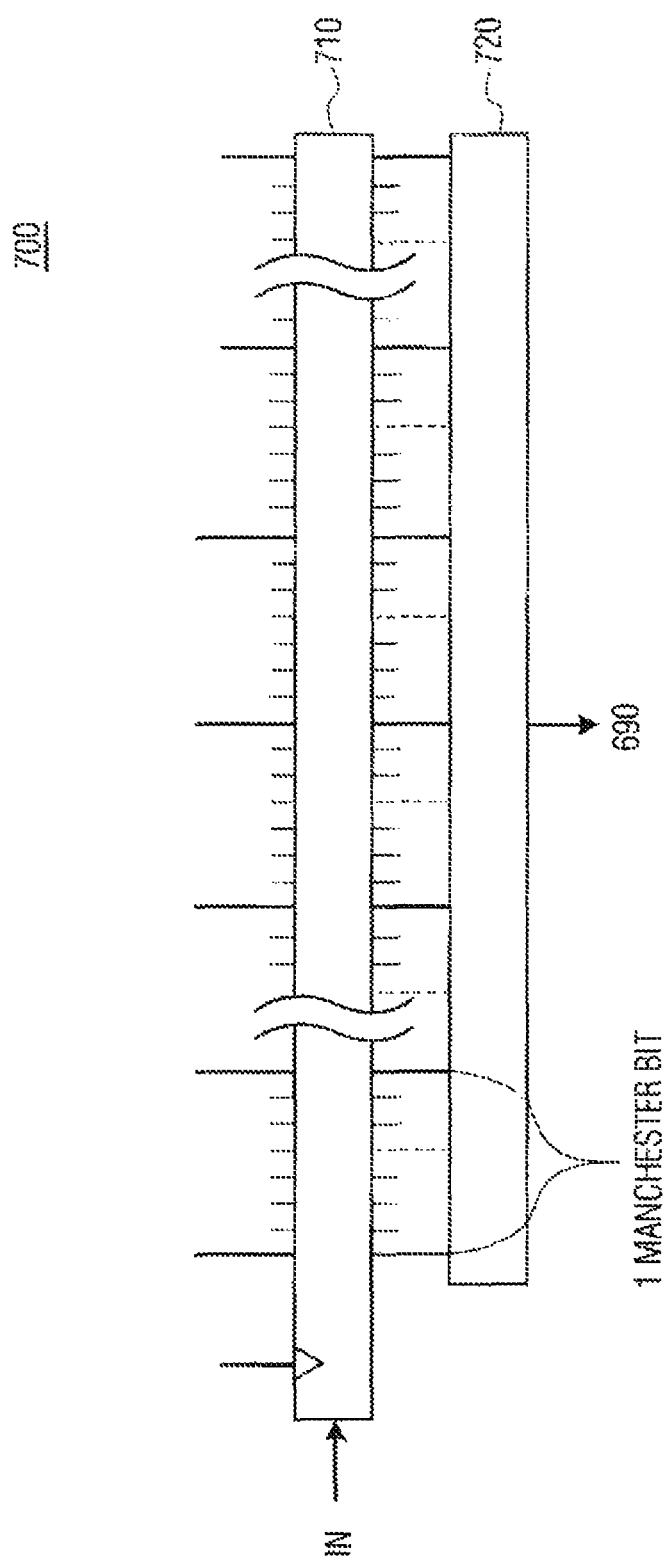
FIG. 7 illustrates a correlator circuit in accordance with an example embodiment.

FIG. 7 illustrates a correlator circuit in accordance with embodiments described herein. To verify the received CV 410 and to prevent a false wake up, a correlator circuit 700 is used. In embodiments described herein, the CV 410 is known and the WU pattern 415 is known. Every car key has a different WU pattern 415. If several cars are located in close proximity to each other, the car key only responds to the car it belongs to and not to any other car. Therefore every car key has a dedicated WU pattern 415 and the correlator 700 illustrated in FIG. 7 can be used in order to search for the CV 410 plus WU pattern 415. A comparator 720 of the correlator 700 illustrated in FIG. 7 can use two taps per bit.

FIG. 8 illustrates an example logic representation of a correlator described herein. Every tap 810 has 1 exclusive NOR 820 (XNOR) plus 1 OR gate 830. The OR gate 830 can be used to skip or disable a particular tap. This can be used either to skip a bit phase or to shorten the WU pattern 415. All outputs are ANDed together to produce the output code 690. The correlator 700 is looking for the pattern indicated by the Manchester decoded CV illustrated in FIG. 5.

An alternative implementation can use an adder instead of the AND gate. The adder output is compared against a threshold of a minimum number of samples that should match. If the adder output is greater than or equal this threshold a match is reported. This mechanism can be used to support error tolerance, e.g. to allow successful match, even if one or two samples are destroyed by an interferer.

In order to do this a correlator 700 is used, and the correlator 700 illustrated in FIG. 7 uses over-sampled data. In this case, eight samples per bit are used, and all the samples are input to a shift register 710 illustrated therein. It is possible that more or less samples per bit may be use. The shift register 710 is sized to receive 41 Manchester bits over-sampled at a rate of 8 times each, less 3 total bits for a total of 325 bits. Attached to the shift register 710 of the correlator 700 is a comparison unit 720 to receive and check in the middle and at the end of every bit, to check whether the data in the shift register 710 is the data desired to be received. If there is a match, a micro-controller 145 which is attached to the data receiving circuit 135 is started and communication is continued. The comparison unit 720 can receive 41 bits from the shift register at a time. The 41 bits represent an 8 bit CV plus 1 Manchester bit 0 pattern received from a decoded CV 410 pattern and a decoded 32 bits from a WU pattern 415 that produce a sum pattern of 41 bits.

In some embodiments, if the CV 410 is not MMF decoded, errors can be present when decoding the WU pattern 415 only. Because correlators like correlator 700 are running consistently, noise signals can get shifted into the shift register, and provide a false WU 415 or a false match will be generated. The longer the shift register 710, the more bits can be compared, and the lower the probability that there will be a false wake-up. In embodiments described herein, the length of a given pattern is limited, to an 8 bit CV plus 1 Manchester bit 0 CV 410, a 32 bit WU pattern 415, on the order of 41 bits total. The false WU rate is determined by these 41 bits.

The comparator 720 may compare the 41 bit sum pattern to a known pattern to determine key and base station authenticity. Also, the comparator 720 may make use of the Manchester decoder and tap the 41 bit sum pattern at the middle of the bit and the end of the bit to produce 82 samples to be compared. This additional function of the Manchester matched filter allows greater accuracy in the decoding process and changes the false acceptance rate of the correlator 700 to differentiate real signals from noise signals.

The false wake-up rate goes down if there are more comparisons for a same number of bits. Embodiments described herein allow lower false wake-up rates to be achieved with the same WU pattern length, or shorter WU patterns 415 can be used to achieve the same false wake-up rate with the additional comparisons made with the Manchester decoded CV 410.

Embodiments described herein use the Manchester decoded CV plus WU pattern 415 instead of a Manchester WUP pattern only. The 8 bit CV 410 plus 32 bit WU pattern 415 is used instead of a 40 bit WU pattern 415. Alternative code violations could be used for future protocols. A CV 410 could lower the risk of false sync during data transmission and reception. A CV could be beneficial for receipt of a WU pattern 415 with a bad auto-correlation function.

For some bits, for some part of the CV 410, the first half and the second half of the bit is used to increase the number of comparisons. As illustrated in FIG. 5 are some Xes in between decoded half bits. The Xes are parts where the output of the matched filter is not recorded because there is no rising edge or falling edge. The MMF codes 1s and 0s at respective rising edges and falling edges. When there is no rising or falling edge, the output of the MMF is unreliable and may be discarded, which is denoted with X.

The recorded Xes in the decoded CV 410 are offset and diminished by the increased number of half bits decoded by the MMF. In the middle of the CV 410 there are sections that use three consecutive sub-sequenced half bits, and at the end of the CV 410 there is another two half bits to be used. The use of these additional half bits read out by the MMF of the CV 410 increases the number of comparisons made by the correlator, and therefore reduces the false WU rate. This ability to read half bits also allows the Manchester matched filter to identify the CV waveform 410 regardless of where it is located in the pattern.

Figure 9:
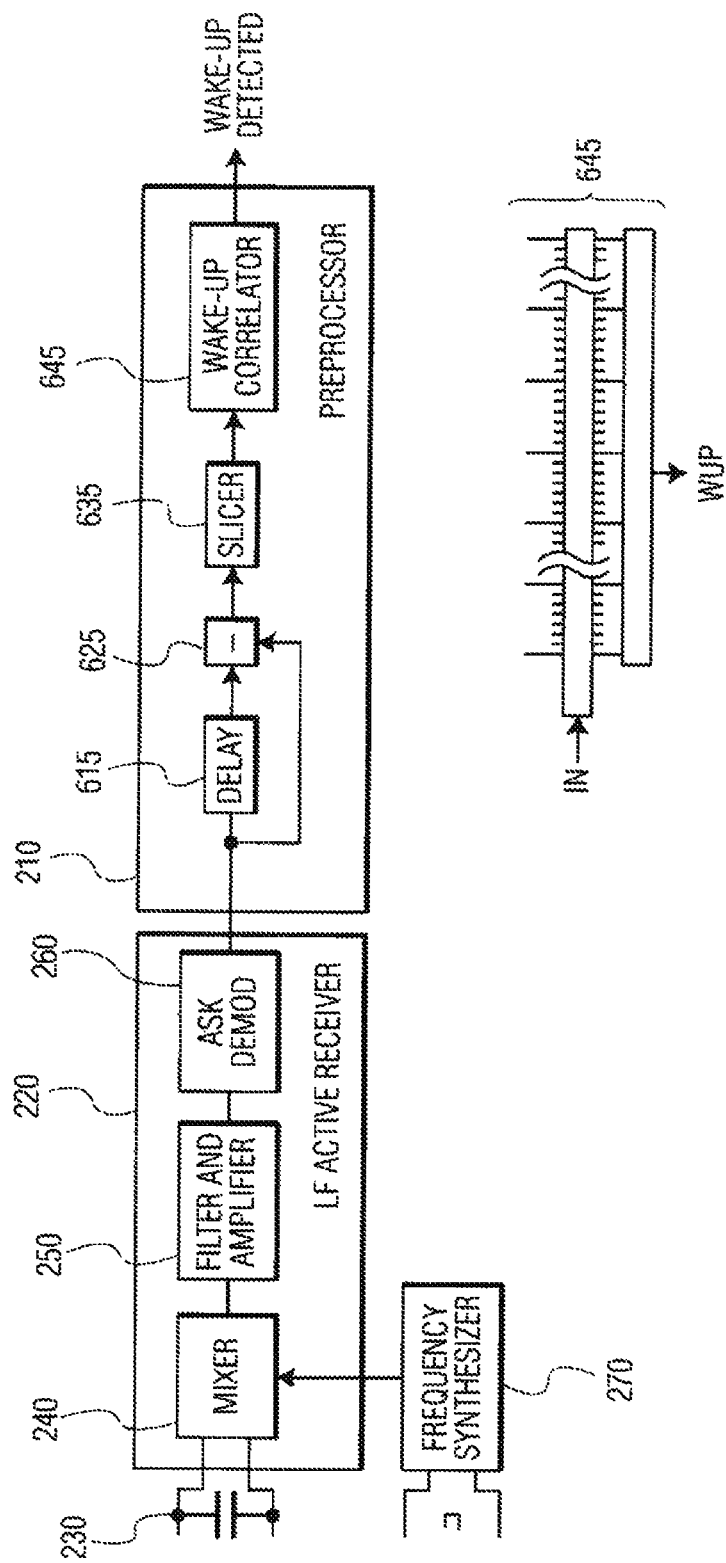
FIG. 9 illustrates a block diagram of a receive chain in accordance with an example embodiment.

The block diagram of FIG. 9 illustrates a complete receive chain of a PKE receiver 220 along a single path within the preprocessor 210, including a delay 615 and subtractor 625 to perform a portion of Manchester decoding after receiving data from a mixer 240, filter and amplifier stage 250 and demodulator 260, a slicer 635 to divide the input signal into bits and wake-up correlator 645 to verify a CV code 410 and WU pattern 415 decoded by the MMF. Inputs to the receiver 220 include modulated LF carrier from LF coils 230 and a clock signal from frequency synthesizer 270.

The MMF includes the delay 615 and subtractor 625, together with the filtering of components in the LF active receiver 220. The filtering and amplifying stage 250 may perform signal integration. The preprocessor 210 performs one-bit A to D conversion. Up to the delay 615, the signal is analog. After the slicer 635 there is a one-bit signal that is input into the wake-up correlator 645. An analog baseband input or is sufficient to be decoded in this manner. The initial signal may also be digital.

The output of the matched filter is sampled eight times, to determine the correct phase. Integrating the data stream by the MMF, the result is a triangular waveform out of the matched filter, and the triangle at the end of the bit is either the maximum positive value or maximum negative value. If the result is sliced in the middle the result is either zero or one. If the result is sliced before the end of the bit, then only part of the energy is captured.

Figure 10:
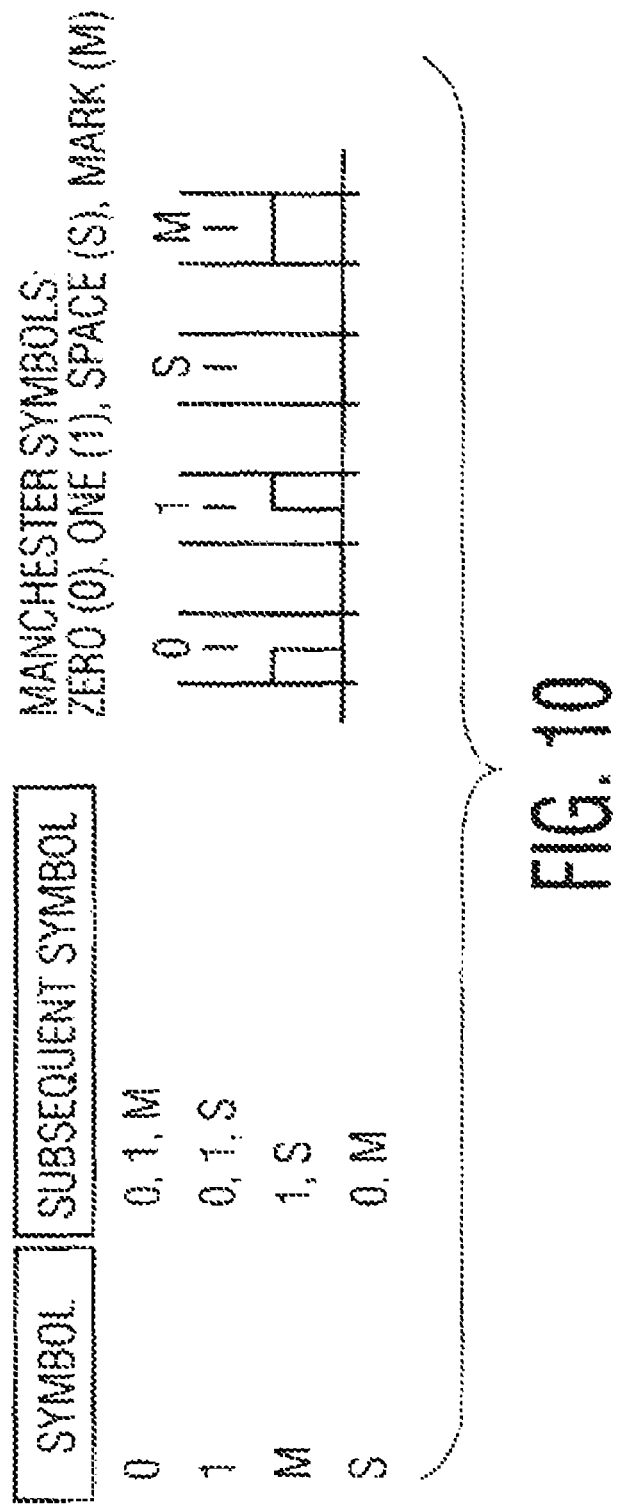
FIG. 10 illustrates a Manchester coding scheme for code violations in accordance with an example embodiment.

FIG. 10 illustrates a Manchester coding scheme for code violations according to another embodiment. Using the current PKE architecture, CVs can be designed that can be supported and received unambiguously, in order that the output symbols would be set based on the input symbol or signals. The table gives a method to define CVs in a manner so that they can be exploited by this particular application. In this case, decoding the CV results in a regular pattern of ones and zeroes, in which the whole CV may be decoded as ones or zeroes. The irregular decoded CV pattern may include ones or zeroes detected in a combination of one half bit apart and two half bits apart.

Figure 11:
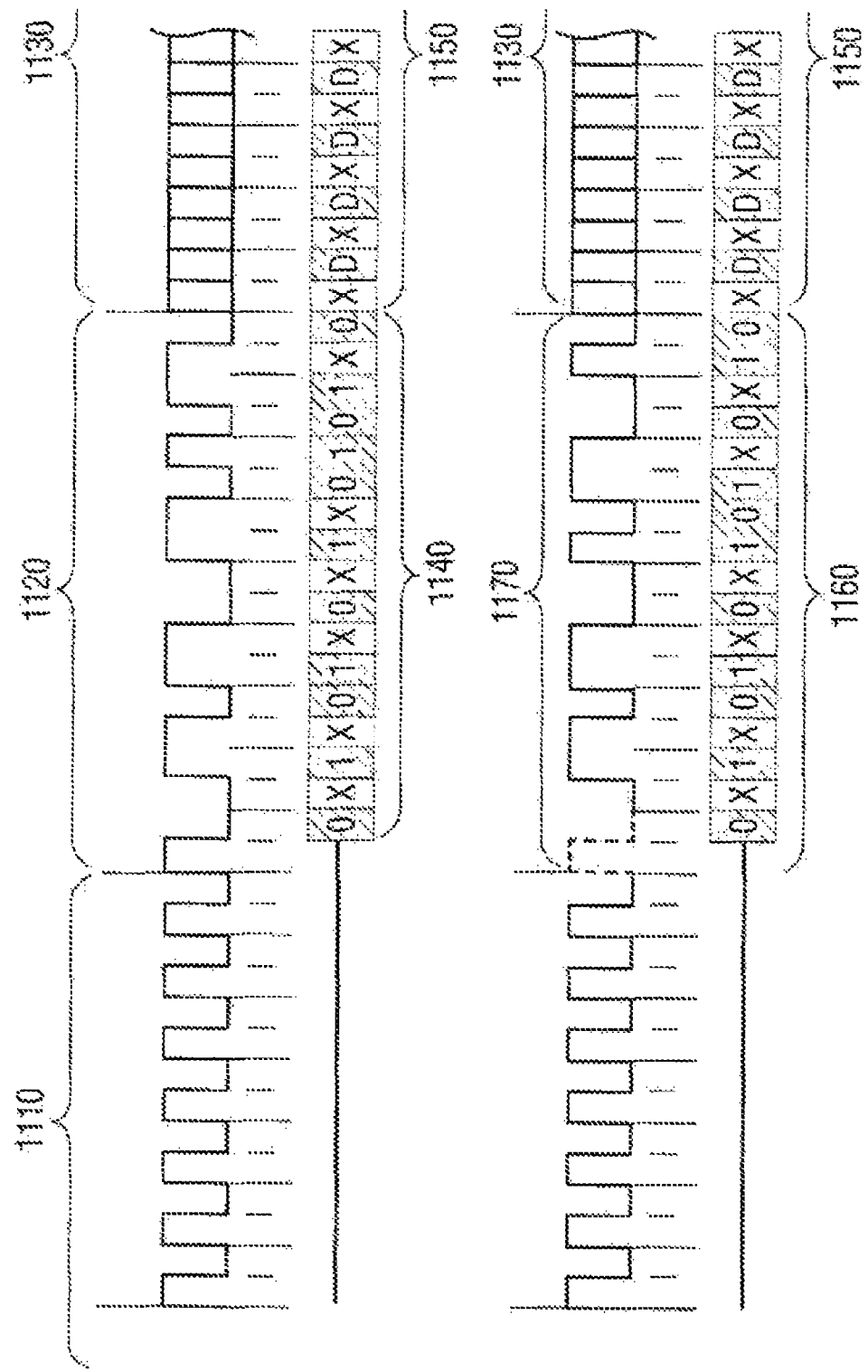
FIG. 11 illustrates examples of unambiguous code violations in accordance with an example embodiment.

FIG. 11 illustrates examples of unambiguous code violations. One bit halves of the code violation can be used unambiguously. Preamble 1110 is used to set the receiver, and produces no Manchester output code as indicated. 9 bit CVs 1120 and 1170 produce completely readable output codes 1140 and 1160 respectively. Similar to FIG. 5, uniformly connected WU patterns 1130 produce output code 1150.

Figure 12:
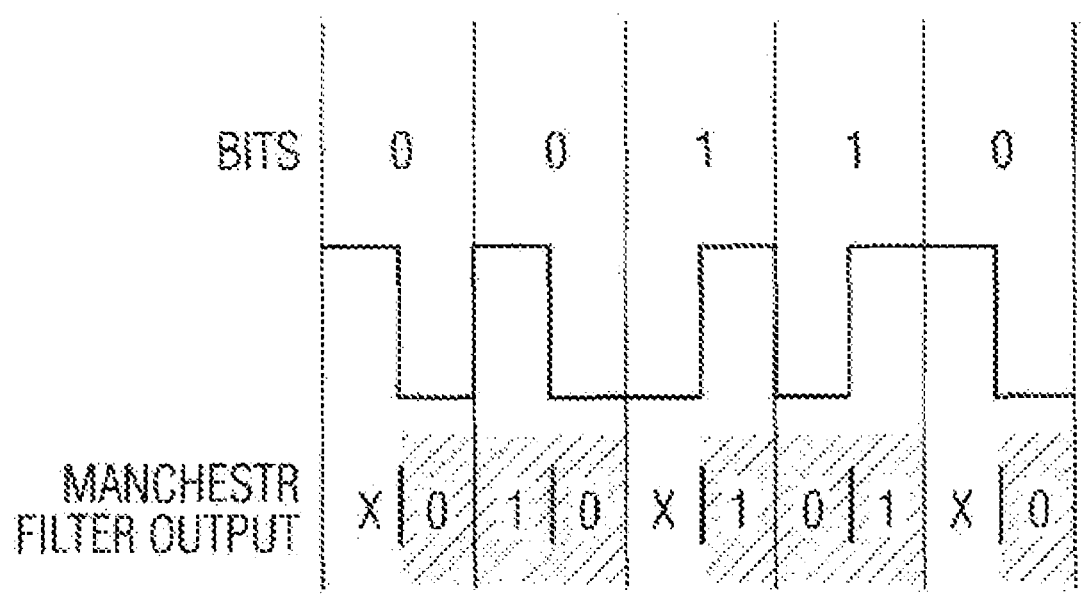
FIG. 12 illustrates combinations of adjacent bits that are possible in a Manchester code in accordance with an example embodiment.

FIG. 12 illustrates all combinations of adjacent bits that are possible in a Manchester code. These known outputs can be used to enhance false wake up and other determinations. They include 0 followed by 0 and 1 followed by 1. In these particular cases, the inverted output of consecutive same bits can be exploited by sampling after the first half of the second bit. For the other combinations, 0 followed by 1, and 1 followed by 0, the sample after the first half of the second bit cannot be used. This configuration means that in 50% of combinations one can make use of this behavior, to make or add limitations of comparisons.

As illustrated in FIG. 12, in a Manchester code, the property is that two consecutive same bits are input, since the Manchester reads the transition from low to high or high to low mid-bit, then there is an inverted 1 between two 0s, or an inverted 0 between two 1s. Thus if two adjacent Manchester bits (0 or 1) are the same, the MMF delivers a good signal with the inverted bit value at the first half of the 2nd bit. Designing a system using a MMF in this manner, one can look for this middle bit inversion, and generate more predictability and verification in the system, such as in a WU pattern. This can be exploited in the WUP correlator to increase the number of comparisons.

In order to align the Manchester code properly, there could be either a 0,1 in succession or a 1,0. In these cases there is not a shift at the end of the bit, and the output matches the input.

In embodiments described herein a large portion of a code violation can be reused, the false WU rate is enhanced for a given size correlator, and the correlator input is highly configurable with or without CV or with different CVs. While the current consumption of the correlator may be increased to deal with the additional half bit data from the CVs, the overall current consumption is lowered as compared to the solution using two separate paths by reuse of system resources.

The invention claimed is:

1. A method of decreasing false detection of wake-up patterns of a receiver, comprising:
   receiving a protocol frame in the receiver, wherein the protocol frame includes a preamble, non-biphase code violation encoded information having a plurality of bit lengths, and a wake up pattern;
   decoding the protocol frame using a biphase decoder to produce a detected code;
   correlating the code violation of the detected code with a known code to verify the non-biphase encoded information; and
   over-sampling the detected code to produce a plurality of bits and inputting the plurality of bits into a correlator.

2. The method of claim 1, wherein decoding the protocol frame further comprises decoding the code violation and the wake up pattern respectively.

3. The method of claim 2, wherein decoding the code violation results in an irregular pattern of ones and zeroes.

4. The method of claim 1, wherein decoding the protocol frame further comprises using a Manchester matched filter to decode the protocol frame.

5. The method of claim 2, comprising decoding the wake up pattern to result in a regular pattern of ones and zeroes and adding the decoded code violation to the decoded wake up pattern to produce a sum pattern.

6. The method of claim 5, comprising over-sampling the sum pattern to produce a plurality of bits and inputting the plurality of bits into a correlator.

7. The method of claim 6, comprising correlating the sum pattern to a known pattern to decrease the false wake up rate of the receiver.

8. The method of claim 1, wherein the biphase decoder integrates the protocol frame over complete bit lengths to produce the detected code.

9. A receiver to decrease false wake-up patterns of a receiver circuit, comprising:
   a receiver front end configured to receive a protocol frame, wherein the protocol frame includes a preamble, non-biphase encoded code violation information having a plurality of bit lengths, and a wake up pattern;
   a biphase decoder configured to decode the protocol frame to produce a detected code; and
   a correlator configured to correlate the code violation of the detected code with a known code to verify the non-biphase encoded information,
   wherein the detected code is over-sampled to produce a plurality of bits and the plurality of bits is input into a correlator.

10. The receiver of claim 9, wherein the protocol frame includes the code violation and wake up pattern respectively.

11. The receiver of claim 10, wherein the code violation is decoded to result in an irregular pattern of ones and zeroes.

12. The receiver of claim 9, wherein the biphase decoder includes a Manchester matched filter to decode the protocol frame.

13. The receiver of claim 11, wherein the wake up pattern is decoded to result in a regular pattern of ones and zeroes and the decoded code violation is added to the decoded wake up pattern to produce a sum pattern.

14. The receiver of claim 13, herein the sum pattern is over-sampled to produce a plurality of bits and the plurality of bits is input into a correlator.

15. The receiver of claim 14, wherein the sum pattern is correlated to a known pattern to decrease the false wake up rate of the receiver.

16. The receiver of claim 9, wherein the biphase decoder integrates the protocol frame over complete bit lengths to produce the detected code.

* * * * *